Figure 1:
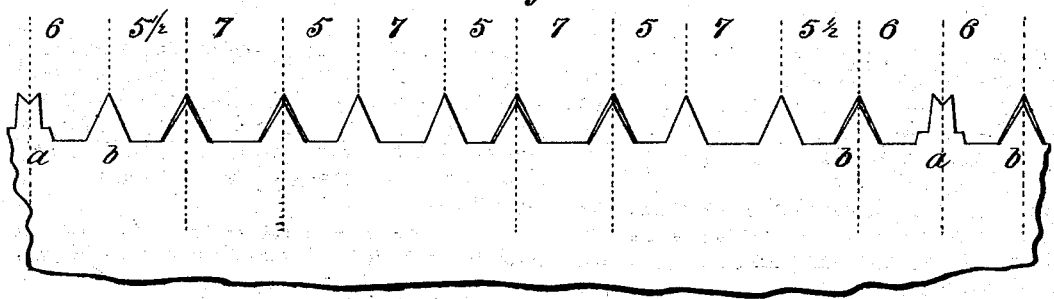

S. H. VOSBURGH.
Saws.

No. 154,104.                                          Patented Aug. 11, 1874.

Witnesses                            Inventor

B. E. Springsteen                   Stephen H. Vosburgh

R. W. Hibbard

UNITED STATES PATENT OFFICE.

STEPHEN H. VOSBURGH, OF OWEGO, NEW YORK.

IMPROVEMENT IN SAWS.

Specification forming part of Letters Patent No. 154,104, dated August 11, 1874; application filed November 26, 1873.

*To all whom it may concern:*

Be it known that I, STEPHEN H. VOSBURGH, of Owego, in the county of Tioga and State of New York, have invented a new and useful Improvement in Saws, of which the following is a specification:

The object of my invention is to arrange saw-teeth so that the saw will cut faster and yet avoid chattering and jumping, and it is done in the following manner:

In the first place, for a cross-cut saw, I divide a section of eleven teeth into sixty-six degrees, and regulate the distance from point to point, as follows: Starting from the clearing-tooth $a$, Fig. 1 in the drawing, I make the point of the first cutting-tooth six degrees from the center of the clearing-tooth; the next is five and a half degrees; the next, seven; the next, five; the next, seven; the next, five; the next is seven; the next is five; the next is seven; the next, five and a half; the next comes to another clearing-tooth, which is six degrees.

In arranging the teeth upon a crosscut-saw I start my clearing-tooth upon the center of the saw. In arranging the setting and filing, the two teeth $b\ b$ adjoining the clearing-tooth $a$ are set and filed alike; the remaining cutting-teeth are set and filed by twos. The width of the clearing-tooth $a$ should be, say, one-fourth the distance to the point of the next tooth.

I am aware of patents No. 105,704 and 14,305, and do not claim any construction therein shown; but,

Having thus fully described my invention, what I do claim, and desire to secure by Letters Patent, is—

A crosscut-saw provided with sections of ten cutting-teeth, $b$, each having the clearing-teeth $a\ a$ on each side of them, and arranged at irregular intervals from said clearing-teeth, and from each other in the proportion of six, five and a half, seven, and five degrees, all constructed as and for the purpose herein specified.

STEPHEN H. VOSBURGH.

Witnesses:
B. C. SPRINGSTEIN,
R. W. HIBBARD.